Patented Mar. 18, 1924.

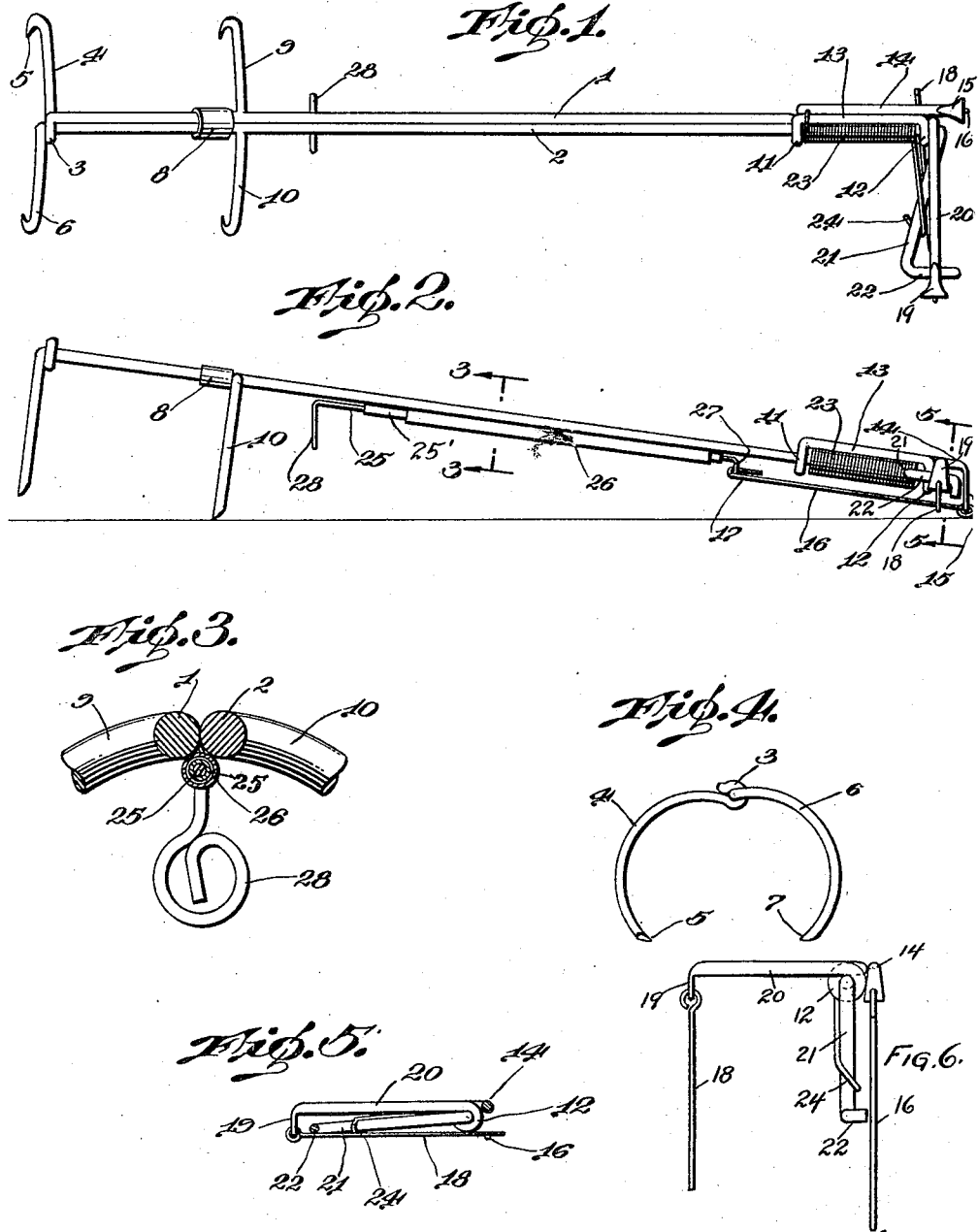

1,487,605

UNITED STATES PATENT OFFICE.

DANIEL W. RISLING, OF MISSION HILL, SOUTH DAKOTA.

TRAP.

Application filed August 11, 1922. Serial No. 581,271.

*To all whom it may concern:*

Be it known that I, DANIEL W. RISLING, a citizen of the United States, residing at Mission Hill, in the county of Yankton and State of South Dakota, have invented new and useful Improvements in Traps, of which the following is a specification.

This invention relates to traps, and more particularly to a trap designed for catching rodents, and an object of the invention is to provide an easily set trap, including a plurality of pairs of jaws, arranged to be disposed, one jaw of each pair upon opposite sides of the runway of rodents, and releasable to permit the jaws to be forced together for catching various types of rodents such as moles, rats or the like.

The present invention embodies improvements over my companion application filed March 18, 1922, Serial No. 544,888, and an object of the said improvements is to provide a trap which is simpler and more compact in its construction and may be manufactured at a lower cost than the type of trap specified in my companion application above referred to.

Other objects of the invention will appear in the following detailed description taken in connection with the accompanying drawing wherein:

Fig. 1 is a plan of the improved trap showing it set.

Fig. 2 is a side elevation of the trap showing it in set position.

Fig. 3 is an enlarged section on the line 3—3 of Fig. 2.

Fig. 4 is an end view of a pair of the jaws of the trap.

Fig. 5 is a section on the line 5—5 of Fig. 2.

Fig. 6 is a sectional view similar to Fig. 5 with the parts in an inoperative position.

Referring more particularly to the drawings, the improved trap comprises a pair of rods 1 and 2 which are constructed of relatively heavy wire or analogous material. The rod 1 is bent adjacent its outer end to form an eye 3 and the terminal, outwardly of the eye 3 is in turn bent to form an arcuate jaw 4, the point 5 of which is sharpened for piercing a rodent. The rod 2 has an arcuate jaw 6 formed upon its terminal, and the rod 2 is rotatably seated in the eye 3 as clearly shown in Figs. 1, 2 and 4 of the drawings. The jaw 6 has its end sharpened as shown at 7 for cooperation with the pointed end 5 of the jaw 4. A collar or band 8 adjacent to the inner set of jaws 9 and 10 extends about the rods 1 and 2 and binds them together for limited rotary movement. The jaws 9 and 10 are similar to the jaws 4 and 6 but are welded, soldered or otherwise suitably attached to or formed upon the rods 1 and 2. The end of the rod 1 remote from the jaws 4 and 9 is bent to provide bearing eyes 11 and 12 which are connected by the length 13, to which a relatively short rod 14 is soldered or otherwise suitably attached. The rod 14 has its end 15 bent at substantially right angles to the rod and flattened. A latch rod 16 is pivotally connected to the flattened end 15 and it has a hook 17 formed upon its free end.

The latch rod 16 is adapted to engage against the second latch rod 18 which extends transversely to the latch rod 16 and is pivotally connected to the flattened terminal 19 of the end 20 of the rod 1, which end 20 extends transversely from the rod 1 at the termination of the bearing eye 12, as clearly shown in the drawings. The rod 2 extends rotatably through the bearing eyes 11 and 12 and has its end 21 bent transversely to its major portion in the same horizontal plane with the major portion of the rod, and its terminal 22 is bent to lie substantially parallel with the major portion of the rod forming a length extending transversely to the end 20 and latch 18 over which the latch rod 16 engages for holding the jaws 4 and 6 and 9 and 10 spread against the tension of the coil spring 23, which has one end connected to the length 13 of the rod 1 and its other end looped about the end 21 of the rod 20 as shown at 24. A trigger 25 extends slidably through a tube 26 which is soldered or otherwise suitably attached to the rod 1. The trigger 25 includes a substantially circular body portion 25' fixed thereto which is movable longitudinally within the tube 26 so that the trigger member may be easily reciprocated to actuate the operating mechanism of the trap. The trigger 25 has a loop 27 on one end through which the hook 17 engages for retaining the latch rods 16 and 18 in locking position to hold the jaws in their open position. An abutment projection 28 is formed upon the end of the trigger 25 remote from the loop 27 and it is positioned between the concave sides of the jaws, 4 and 6, and 9 and 10 when they are spread so that a rodent traveling between the jaws will engage the projection 28 and move the trip rod 25 longitudinally, moving the loop 27 off the hook 17 which releases the latch rod 16 which in turn releases the latch rod 18 and permits the spring 23 to flex for forcing the jaws 4 and 6, and 9 and 10 towards each other and into gripping engagement with the rodent.

It is, of course, to be understood that the invention may be constructed in other manners and the parts associated in different relations and, therefore, I do not desire to be limited in any manner except as set forth in the claims hereunto appended.

Having thus described my invention what I claim is:

1. In a trap, a pair of parallel rods, arcuate gripping jaws formed on said rods, one of said rods being bent to provide a plurality of bearing eyes through which the other rod rotatably extends, said rod having said bearing eyes thereon having its end remote from said jaws extended laterally, a spring connected to said rods for urging said jaws into animal gripping position, and a latch rod carried by said laterally extended end, and releasable means cooperating with said latch rod for restraining said spring from action.

2. In a trap, a pair of parallel rods, arcuate gripping jaws formed on said rods, one of said rods being bent to provide a plurality of bearing eyes through which the other rod rotatably extends, said rod having said bearing eyes thereon having its end remote from said jaws extended laterally, a spring connected to said rods for urging said jaws into animal gripping position, and a latch rod carried by said laterally extended end, said second named rod having its end adjacent to said laterally extended end bent transversely for providing a length adapted to be engaged by said latch rod, and releasable means for maintaining said latch rod in spring restraining position.

3. In a trap, a pair of parallel rods, arcuate gripping jaws formed on said rods, one of said rods being bent to provide a plurality of bearing eyes through which the other rod rotatably extends, said rod having said bearing eyes thereon having its end remote from said jaws extended laterally, a spring connected to said rods for urging said jaws into animal gripping position, and a latch rod carried by said laterally extended end, said second named rod having its end adjacent to said laterally extended end bent transversely for providing a length adapted to be engaged by said latch rod, a second latch rod adapted to engage over said first named latch rod, a hook formed upon one end of said second named latch rod, and a trigger movable longitudinally of said first named rods and looped for engagement with said hook.

4. In a trap, a pair of parallel rods, arcuate gripping jaws formed on said rods, one of said rods being bent to provide a plurality of bearing eyes through which the other rod rotatably extends, said rod having said bearing eyes thereon having its end remote from said jaws extended laterally, a spring connected to said rods for urging said jaws into animal gripping position, and a latch rod carried by said laterally extended end, said second named rod having its end adjacent to said laterally extended end bent transversely for providing a length adapted to be engaged by said latch rod, a second latch rod adapted to engage over said first named latch rod, a hook formed upon one end of said second named latch rod, and a trigger movable longitudinally of said first named rods and looped for engagement with said hook, said trigger having an abutment projection formed thereon adapted to be engaged by the rodent passing between said jaws.

In testimony whereof I affix my signature.

DANIEL W. RISLING.